(12) United States Patent
Allgaier et al.

(10) Patent No.: US 10,306,343 B2
(45) Date of Patent: May 28, 2019

(54) FIELD DEVICE

(71) Applicant: VEGA GRIESHABER KG, Wolfach (DE)

(72) Inventors: Volker Allgaier, Haslach (DE); Christian Sum, Wolfach (DE)

(73) Assignee: VEGA Grieshaber KG, Wolfach (DE)

(*) Notice: Subject to any disclaimer, the term of this patent is extended or adjusted under 35 U.S.C. 154(b) by 60 days.

(21) Appl. No.: 15/397,302

(22) Filed: Jan. 3, 2017

(65) Prior Publication Data

US 2018/0124480 A1 May 3, 2018

(30) Foreign Application Priority Data

Nov. 3, 2016 (DE) .................... 20 2016 106 172 U

(51) Int. Cl.
*H04Q 9/04* (2006.01)
*H04Q 9/00* (2006.01)
*H04Q 9/02* (2006.01)

(52) U.S. Cl.
CPC ............... *H04Q 9/04* (2013.01); *H04Q 9/00* (2013.01); *H04Q 9/02* (2013.01); *H04Q 2209/40* (2013.01); *H04Q 2209/88* (2013.01)

(58) Field of Classification Search
CPC ............. H04Q 9/02; H04Q 9/04; G06F 21/44
USPC ..................................... 340/870.02; 702/188
See application file for complete search history.

(56) References Cited

U.S. PATENT DOCUMENTS

| 7,885,610 | B2* | 2/2011 | Isenmann | ........... H04L 12/4625 340/572.1 |
| 8,160,535 | B2* | 4/2012 | Kielb | ..................... G01D 21/00 455/343.1 |
| 8,538,560 | B2* | 9/2013 | Brown | ............... G05B 19/4185 455/343.1 |
| 8,929,947 | B2* | 1/2015 | Tao | ........................ H04W 76/04 455/554.1 |
| 2005/0289276 | A1* | 12/2005 | Karschnia | .......... G05B 19/4185 710/305 |
| 2011/0289123 | A1* | 11/2011 | Denison | ............. G07C 9/00571 707/812 |
| 2014/0032171 | A1* | 1/2014 | Falk | ....................... G06F 21/44 702/182 |
| 2017/0344751 | A1* | 11/2017 | Brockhaus | ............ G06F 21/629 |
| 2017/0353316 | A1* | 12/2017 | Kostadinov | ......... H04L 63/0428 |

FOREIGN PATENT DOCUMENTS

| DE | 10 2009 022 762 A1 | 5/2009 |
| DE | 10 2013 103 454 A1 | 10/2014 |
| DE | 10 2013 106 098 A1 | 12/2014 |

OTHER PUBLICATIONS

GPTO Office Action for related application 10 2015 117 009.4, dated Jul. 18, 2016.
International search report for related international application PCT/EP2016/066838, dated Sep. 26, 2016.

* cited by examiner

*Primary Examiner* — Albert K Wong
(74) *Attorney, Agent, or Firm* — William Gray Mitchell

(57) ABSTRACT

A field device with a housing, a sensor, and an electronic unit arranged in the housing, with the field device comprising a radio module that can be connected to the electronic unit and removed therefrom.

12 Claims, 2 Drawing Sheets

FIELD DEVICE

CROSS REFERENCE TO RELATED APPLICATIONS

This patent application claims priority to German Patent Application 20 2016 106 172.5, filed on Nov. 3, 2016.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a field device.

Background of the Invention

In process automation technology, field devices frequently are used which serve for detecting and/or influencing process variables. Examples for such field devices are fill gauges, limit detectors, and pressure gauges with sensors detecting the respective process variables fill levels, limit, or pressure. Frequently such field devices are connected to superordinate units, such as guiding systems or control units. These superordinate units serve for process control, process visualization, and/or process monitoring. The field devices known from prior art generally comprise a housing, a sensor, and an electronic unit arranged in the housing.

The energy and/or signal transmission between the field device and the superordinate units occurs frequently based on the known 4 mA to 20 mA standard, in which a 4 mA to 20 mA power circuit and/or a two-wire line is formed between the field device and the superordinate unit. In addition to the analog transmission of signals here the option is provided that the measuring devices can transmit other information to the superordinate unit or receive them therefrom according to various other protocols, particularly digital protocols. Examples mentioned therefor are the HART-protocol or the Profibus-PA-protocol.

The energy supply of these field devices also occurs via the 4 mA to 20 mA power signal, so that in addition to the two-wire line no further supply line is necessary.

To keep the expense for wiring and installation as well as for security measures as low as possible, for example in applications in areas to be protected from explosion, it is also undesired to provide additional power supply lines.

For example, external control units are known from prior art which are connected to the 4 mA to 20 mA power circuit for the purpose of physically communicating with the field device in order to allow the control of the field device via the 4 mA to 20 mA power circuit via the HART protocol. Such external control units are disadvantageous here in that, as already mentioned, a physical connection is required to the 4 mA to 20 mA power circuit. For this purpose, the two-wire line must be modified such, for example insulated and/or severed, that the control unit can be connected. This represents a relatively high expense and cannot always be implemented easily on site.

It is also known from prior art to use radio modules for an easier control of the field devices. Solutions are known in which the field devices show integrated radio modules, radio modules are expensively retrofitted, or they are arranged in a measuring transducer—supply unit, a device for the energy supply of the field devices. In particular, in variants with integrated radio modules or a radio module to be retrofitted, the problem is given in prior art that in case of an energy supply via the 4 mA to 20 mA power circuit here only extremely low power is available and the energy that can be supplied via the power circuit is partially insufficient in order to supply simultaneously the electronic unit and the sensor with energy, so that operation cannot occur or only under aggravated conditions.

In prior art solutions are provided therefor in which the radio module is provided with its own supply line or additional batteries are provided in the field device for operating the radio module. Separate supply lines however require the above-mentioned increased installation and security expense, which shall be avoided. All field device equipped with radio modules are subject to the additional risk that they cannot be controlled at all times so that an unintentional operation or even an intentional manipulation could not be excluded or prevented at all times.

The objective of the present invention is to allow a simple retrofitting of radio modules and to exclude any attacks by targeted manipulation of field devices, since this represents an increasing risk.

The invention is based on the objective to further develop a field device of prior art with a preferably modular design such that the disadvantages and risks known from prior art are avoided.

This objective is attained in a field device with the features of claim 1.

BRIEF SUMMARY OF THE INVENTION

In a preferred embodiment, a field device (1) with a housing (3), a sensor (5), and an electronic unit (6) arranged in the housing (3) characterized in a radio module (9) that can be connected to the electronic unit (6) and disconnected therefrom.

A field device (1) according to claim 1, characterized in that the radio module comprises a control element (11) for activating and deactivating the radio module (9), with the control element (11) being mechanically arranged such that any operation of the control element (11) is only possible when the field device (1) is deactivated.

In another preferred embodiment, the field device as described herein, characterized in that the control element (11) is accessible only when the radio module (9) is removed.

In another preferred embodiment, the field device as described herein, characterized in that the radio module (9) is arranged in a display and/or control unit (7).

In another preferred embodiment, the field device as described herein, characterized in that the display and/or control information is transmitted by wired between the display and/or control unit (7) and the electronic unit (6).

In another preferred embodiment, the field device as described herein, characterized in that the display and/or control information is wirelessly transmitted via the radio module (9) between the display and/or control unit (7) and the electronic unit (6).

In another preferred embodiment, the field device as described herein, characterized in that the radio module (9) is mechanically anchored and the control element (11) is arranged at the bottom (13) of the radio module (9) such that the control element (11) is accessible only after releasing the anchoring and removing the radio module (9) from its housing.

In another preferred embodiment, the field device as described herein, characterized in that the field device (1) can be mechanically locked and secured from unauthorized access.

In another preferred embodiment, the field device as described herein, characterized in that the radio module (9) comprises a separate, integrated energy supply, particularly a battery for the partial or complete energy supply of the radio module (9).

In another preferred embodiment, the field device as described herein, characterized in that the radio module (1) comprises a timer unit.

In another preferred embodiment, the field device as described herein, characterized in that after activation the radio module (9) remains activated for a predetermined period and then is automatically deactivated.

In another preferred embodiment, the field device as described herein, characterized in that the electronic unit (6) and the display and/or control unit (7) each comprise a radio module (9), with the radio modules (9) being embodied such that they receive radio signals from another radio module (9) and transmit them.

In another preferred embodiment, the field device as described herein, characterized in that the radio module (9) or the display and/or control unit (7) can be arranged in a housing (3).

In an alternate preferred embodiment, a modular field device system for generating field devices (1) with
a plurality of housings (3),
a plurality of sensors (5),
a plurality of electronic units (6) that can be connected to the sensors (5),
a plurality of display and/or control units (7) that can be connected to the electronic units (6), with the field device system comprising at least one display and/or control unit (7) with a radio module (9) for the wireless communication with at least one other unit.

In another preferred embodiment, a modular field devices system as described herein above, characterized in that the radio module (9) comprises a control element (11), particularly a switch or sensor, for activating and deactivating the radio module (9), which is arranged such that a mechanic activation of the control element (11) is only possible when the field device (1) is deactivated, particularly when the display and/or control unit (7) is removed from the field device (1).

DETAILED DESCRIPTION OF THE INVENTION

Figure 1:
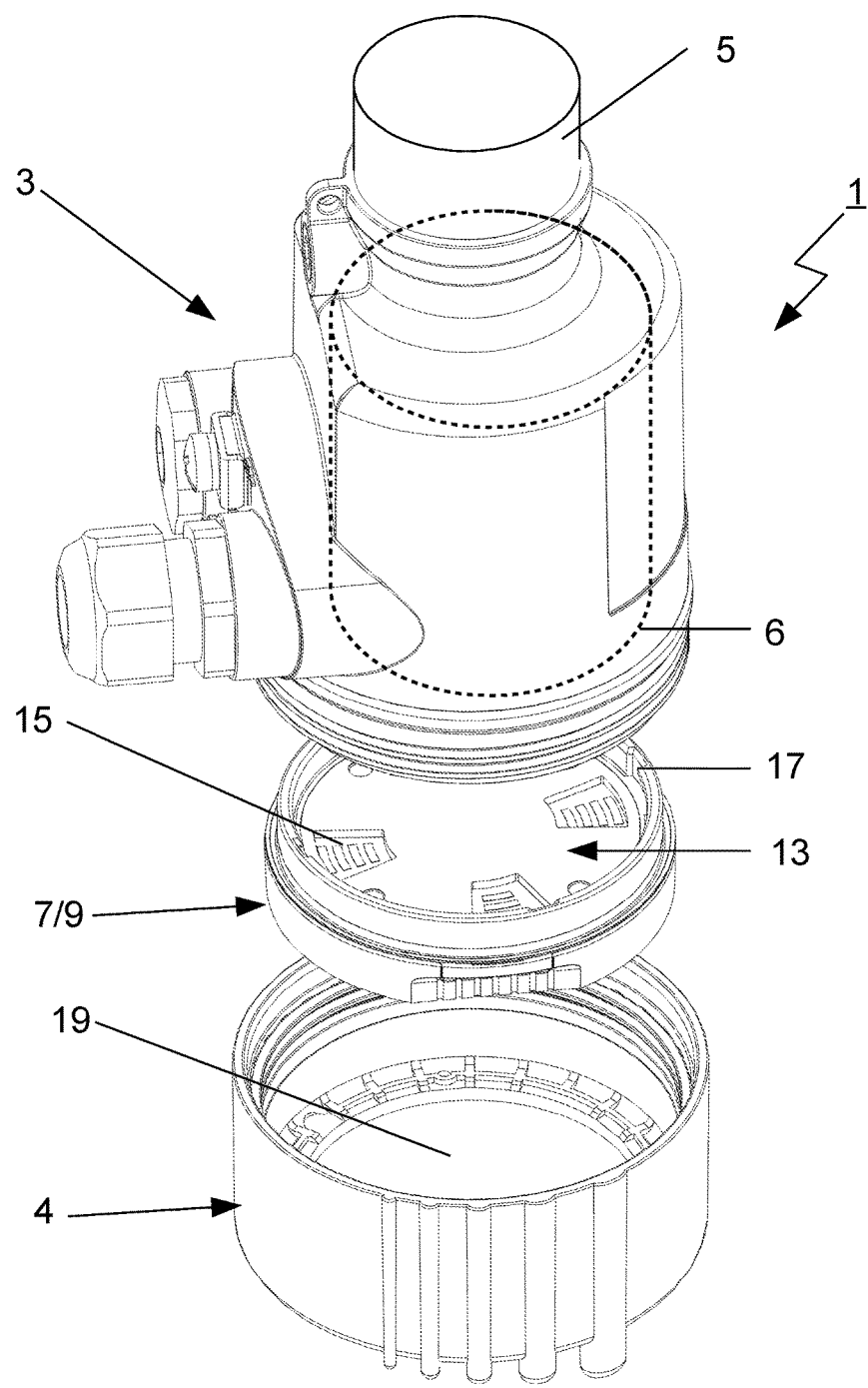
FIG. 1 is a line drawing evidencing a perspective exploded illustration of a first exemplary embodiment of a field device according to the present invention.

The invention is a field device comprising a housing, a sensor, and an electronic unit arranged in the housing, as well as a radio module that can be connected to the electronic unit and disconnected therefrom. Such an embodiment of the radio module is advantageous in that even older field devices, previously operated without any radio module, can easily be retrofitted with a radio module.

The housing of the radio module is advantageously made from a synthetic material.

In another further development the radio module comprises a control element for activating and deactivating the radio module, which is arranged mechanically such that any operation of the control element is possible only in case of a deactivated field device, and/or in case of the control unit being removed, and/or in case of an open housing. Such an arrangement of the control element for activating and deactivating the radio module shows the advantage that any activation or deactivation of the radio module cannot occur without being noticed, because any deactivation of the field device by a superordinate unit, for example a superordinate control, is registered in any case. Further, by an appropriate mechanic arrangement it is ensured that any accidental activation or deactivation of the radio module is excluded.

Such an operating element can further be beneficial for aspects of energy in order to completely deactivating the radio module and for example to completely prevent any search operations for available communication partners or the like. This way, additionally considerably lower energy consumption can be achieved.

A beneficial mechanic arrangement is yielded when the control element is arranged such that it is accessible only when the radio module has been removed. If the radio module is usually connected mechanically and electrically to the electronic unit it can be ensured this way that by removing the radio module from the electronics unit here a deactivation of the field device is initiated so that it can be detected in a superordinate unit.

An optimal embodiment is yielded here when the radio module is arranged in a display and/or control unit, with the housing thereof preferably being made from a synthetic material.

Usually field devices according to prior art are equipped with a display and/or control unit, allowing on site for example to read measurements or configurations of the field device. By an integration of the radio module in such a display and/or control unit here a space-saving design as well as an electrically beneficial design can be yielded, because the display and/or control unit is generally also equipped with respective electronic components for displaying measurements and/or the configuration of the field device. In such a configuration it is possible that the radio module only transmits the already processed measurements or respective configuration features and thus multiple appropriate electronic components no longer need to be installed.

Advantageously the display and/or control information is transmitted by wires between the display and/or control unit and the electronic unit. If therefore the radio module is also arranged in the display and/or control unit here too a wired transmission of the display and/or control information occurs between the radio module and the electronic unit. A respective design allows a particularly easy integration of the radio module in existing field device concepts, with here particularly no changes are required at the electronic unit.

It shall be mentioned at this point that any communication between the electronic unit and the radio module can occur via wires even without the radio module being arranged in a display and/or control unit.

Alternatively it is also possible, though, that the display and/or control information is transmitted in a wireless fashion via the radio module between the display and/or control unit and the electronic unit and/or between the radio module and the electronic unit. In this case it is conditional though that the electronic unit already comprises a radio module by which radio communication is possible.

A particularly clever arrangement can be achieved when the radio module is mechanically anchored such that the control element is arranged at a bottom of said radio module such that the control element is accessible only after the anchoring has been released and the radio module has been removed from its housing. If for example the radio module is mechanically fastened via a latching or bayonet fastener to the electronic unit, any control element provided at the bottom of the radio module, i.e. at a side of the radio module facing the electronic unit, can only be operated when the mechanic anchoring of the radio module has been released and it has been removed from the electronic module.

Advantageously the field device can further be locked mechanically and embodied in a fashion such that it can be protected from unauthorized access. This way, by an appropriate embodiment of the housing, manipulations can be prevented in a more effective fashion.

Specifically, for field devices in which radio modules shall be retrofitted, but also in field devices in which regularly radio modules are provided it can be advantageous for the radio module to comprise an integrated separate energy supply, particularly a battery, for the partial or complete energy supply of the radio module. This can be particularly advantageous for field devices, operated with low power or in which retrofitting radio modules was previously not provided within the energy concept of the field device, because this way the operation of a radio module can occur independently from the energy supply of the field device. However, it can also be beneficial for field devices in which the radio module is not retrofitted but is already considered within the energy concept of the field device. By such a battery for example an increased range of the radio module can be yielded or an increased band width of the radio communication required for certain applications by additional energy being provided from the separate energy supply unit and/or the battery.

The radio module can further comprise for example a timer unit so that the radio module can be activated only at certain times.

Such a timer unit can also be used to ensure that the radio module remains activated for a predetermined period and then is automatically deactivated. This way it is possible for example that the radio module is active for a certain configuration, for example for 10 minutes, with the radio module then automatically being deactivated so that on the one hand here energy is saved and on the other hand any attempts for manipulation are effectively countered by the radio interface.

Further the electronic unit and/or the display and/or the control unit may each show a radio module, with the radio modules being embodied such that they receive radio signals from another radio module and transmit them. This way an effective increase in range of the radio modules of the field devices can be yielded, allowing wide ranges even in case of low transmission power of the radio modules.

A modular field device concept for the generation of field devices comprises a plurality of housings, a plurality of sensors, as well as a plurality of display and/or control units that can be connected to the sensors, with the field device system comprising at least one display and/or control unit with a radio module for the wireless communication with another unit.

Such a field device concept comprises here a number of exchangeable modules, adjusted to each other, however at least one display and/or control element showing an integrated radio module. This way, field devices initially embodied without a radio module can be equipped with a radio module by a simple exchange of the display and/or control unit. This way it is easily possible to retrofit even older field devices with a modular design.

In a further development, the radio module may comprise a control element, particularly a switch or sensor, in order to activate and deactivate the radio module which is mechanically arranged such that any operation is possible only with the field device being deactivated, particularly when the display and/or control unit is removed from the field device.

In the following the present invention is explained in detail based on an exemplary embodiment as appearing in the attached figures.

DETAILED DESCRIPTION OF THE FIGURES

FIG. 1 shows in an exploded illustration of a perspective view a field device 1 according to the present invention. The field device 1 comprises essentially a housing 3, in which an electronic unit 6 is arranged (not shown here). At one end the electronic unit 6 is connected to a sensor 5, in the present case indicated only schematically, which is arranged at the housing 3. The sensor 5 may however also be arranged via respective measuring lines off-set from the housing 3, and for example via appropriate extensions be arranged in a measuring environment.

The field device 1 can for example be connected via a two-wire line, guided through an appropriate opening in the housing 3, to a superordinate unit, for example a control or measuring station.

At a side opposite the sensor side in the present exemplary embodiment a display and/or control unit 7 is shown with an integrated radio module 9.

The display and/or control unit comprises a housing made from a synthetic material. This way, signals of the radio module can be decoupled in a particularly beneficial fashion. The display and/or control unit 7 can be mechanically connected to the electronic unit 6 via a bayonet fastener 17 provided at a circumferential brim of the display and/or control unit, with in case of a mechanic connection simultaneously via fastening contacts 15, which are arranged at the bottom of the display and/or control unit 7, an electric connection being generated here. At a side of the display and/or control unit 7 facing away from the electronic unit 6 in the present exemplary embodiment a display is provided to show measurements or other device-specific information as well as a keypad for entering operator information, for example for the configuration of the electronic unit 6. In the present exemplary embodiment the housing 3 can be closed with a lid 4, with a viewing window 19 being arranged in the lid 4 such that the display unit of the display and/or control unit 7 remains visible from the outside even when the lid 4 is placed thereon.

In the present case the field device 1 is a part of a modular system for generating field devices 1. The modular field device system comprises a plurality of components, adjusted to each other, which can be combined with one another based on customer and/or process requirements.

This way it is particularly possible to retroactively reach via radio a modularly designed field device 1, which had been designed without any radio module 9, by exchanging the existing display and/or control unit for a display and/or control unit 7 with an integrated radio module 9, or to allow such a configuration.

Figure 2:
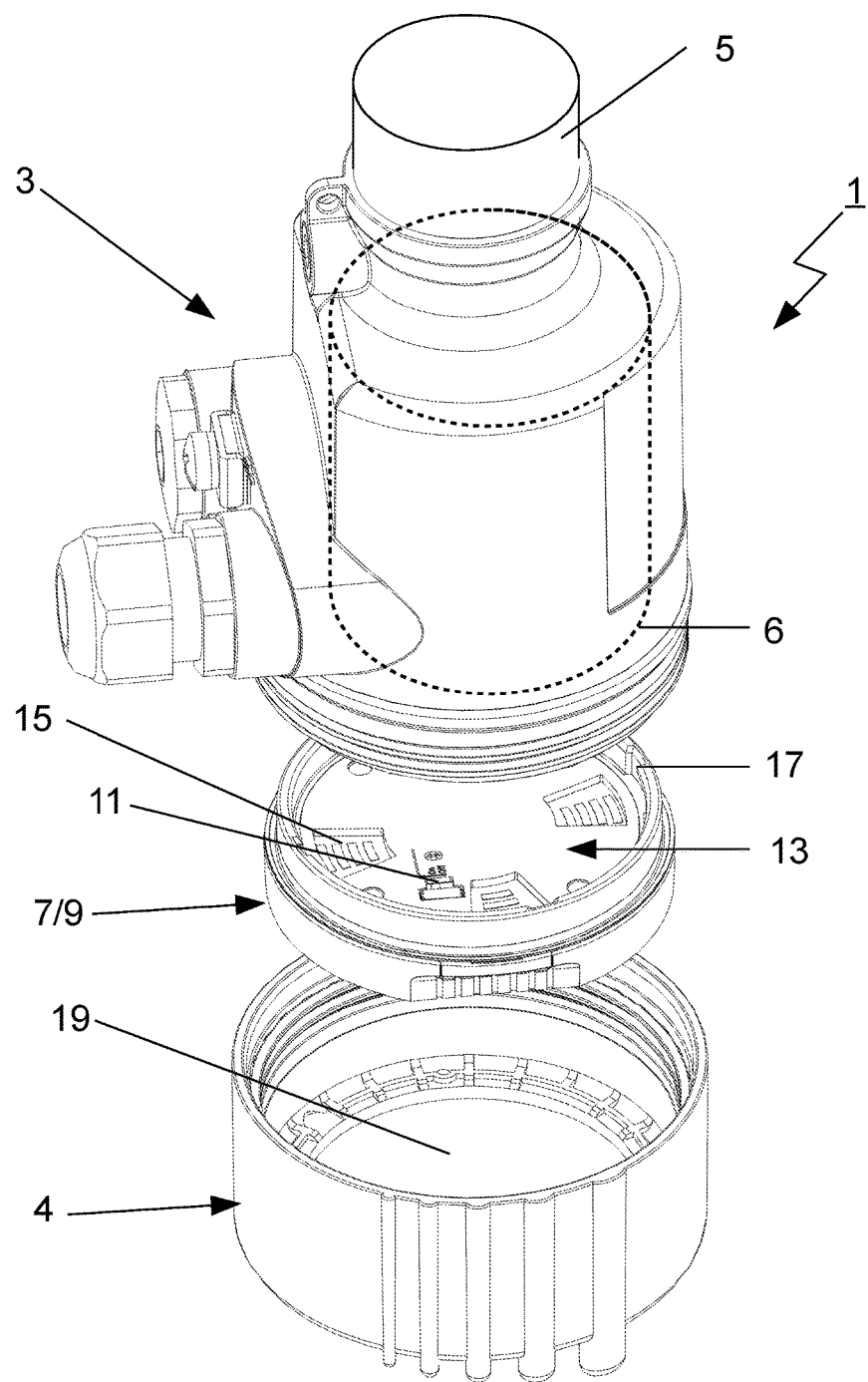
FIG. 2 a further development of the exemplary embodiment of FIG. 1 with a control element.

FIG. 2 shows a display and/or control unit 7 of the exemplary embodiment of FIG. 1 at the side facing the electronic unit 6 comprising a control element 11 to activate and deactivate the radio module 9 arranged in the display and/or control unit 7. The control element 11 is embodied as a mechanic slide switch in the present exemplary embodiment, however it can also be embodied as a rocker switch, push button, magnetic switch, or the like.

The control element 11 is accessible in the present exemplary embodiment for activating and deactivating the radio module 9 only when the display and/or control unit 7 is disconnected from the electronic unit 6 and removed from the housing 3. This way an effective protection from faulty operation is given.

Further, by the fact that the display and/or control unit 7 must be removed from the electronic unit 6 in order to operate the control element 11 here a temporary deactivation of the field device 1 overall is also initiated so that by the temporary deactivation of the field device 1 any manipulations can easily be detected.

LIST OF REFERENCE NUMBERS 1 field device
3 housing
4 lid
5 sensor
6 electronic unit
7 display and/or control unit
9 radio module
11 control element
13 bottom
15 contacts
17 bayonet fastening
19 viewing window The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A field device comprising a housing, a sensor, and an electronic unit arranged in the housing and a radio module that can be connected to the electronic unit and disconnected therefrom, wherein the radio module comprises a control element for turning on and off the radio module, with such control element mechanically arranged so it can be operated only when the radio module is disconnected.

2. The field device according to claim 1, wherein the control element is accessible only when the radio module is removed.

3. The field device according to claim 1, wherein the radio module is arranged in a display and control unit comprising electronic components for displaying measurements and configuring the field device.

4. The field device according to claim 3, wherein the display and control information is transmitted by wire between the display and control unit and the electronic unit.

5. The field device according to claim 3, wherein the display and control information is wirelessly transmitted via the radio module between the display and control unit and the electronic unit.

6. The field device according to claim 1, wherein the radio module is mechanically anchored and the control element is arranged at the bottom of the radio module such that the control element is accessible only after releasing the anchoring and removing the radio module from its housing.

7. The field device according to claim 1, wherein the field device can be mechanically locked and secured from unauthorized access.

8. The field device according to claim 1, further comprising wherein the radio module comprises a battery for the partial or complete energy supply of the radio module.

9. The field device according to claim 1, further comprising wherein the radio module comprises a timer unit.

10. The field device according to claim 9, wherein after activation the radio module remains activated for a predetermined period, such period programmed into the timer unit, and then is automatically turned off by the timer unit.

11. The field device according to claim 5, wherein the electronic unit and the display and/or control unit each comprise a radio module, with the radio modules being embodied such that they receive radio signals from another radio module and transmit such radio signals.

12. The field device according to claim 1, wherein the radio module or the display and control unit can be arranged in a housing.

* * * * *